(12) United States Patent
Miyata et al.

(10) Patent No.: US 7,387,760 B2
(45) Date of Patent: Jun. 17, 2008

(54) APPARATUS FOR AND METHOD OF MAKING INFLATION FILMS

(75) Inventors: Takahiro Miyata, Okayama (JP);
Katsunori Hatashi, Niigata (JP);
Tatsuya Sunamoto, Kurashiki (JP);
Tadao Yoshikawa, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 555 days.

(21) Appl. No.: 10/650,680

(22) Filed: Aug. 29, 2003

(65) Prior Publication Data

US 2004/0113331 A1 Jun. 17, 2004

(30) Foreign Application Priority Data

Aug. 30, 2002 (JP) ............................. 2002-254086

(51) Int. Cl.
*B29D 22/00* (2006.01)
(52) U.S. Cl. ........................................ 264/564; 264/573
(58) Field of Classification Search ................. 264/564, 264/573
See application file for complete search history.

(56) References Cited

U.S. PATENT DOCUMENTS 3,985,849 A * 10/1976 Notomi et al. ............... 264/567
4,330,501 A * 5/1982 Jones et al. .................. 264/566
5,468,444 A * 11/1995 Yazaki et al. ................ 264/566
5,525,277 A * 6/1996 Joseph ....................... 264/40.6

FOREIGN PATENT DOCUMENTS

| JP | 06-039916 | 2/1994 |
| JP | 6-182868 | 7/1994 |
| JP | 2002-240146 | 8/2002 |

OTHER PUBLICATIONS

U.S. Appl. No. 10/843,308, filed May 12, 2004, Yoshikawa, et al.
U.S. Appl. No. 10/650,680, filed Aug. 29, 2003, Miyata, et al.

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

An apparatus for making an inflation film formed by extruding a raw resin in a molten state through a circular die to form a tubular film, and expanding the tubular film by the pressure of a gaseous medium introduced into an inner space thereof, while the tubular film is being cooled. The apparatus includes a cooling ring, at least one air ring coaxial with the circular die, and an adjusting device for adjusting the temperature of a gaseous medium, blown from the air ring, to a range effective to retain the tubular film, then still in a molten phase, in a condition in which the tubular film is inflated. A method for making an inflation film is also disclosed.

9 Claims, 4 Drawing Sheets

APPARATUS FOR AND METHOD OF MAKING INFLATION FILMS

RELATED APPLICATIONS

This application is based on the Japanese Patent Application No. 2002-254086, filed on Aug. 30, 2002, the entire contents of which are hereby incorporated by reference.

BACKGROUND OF THE INVENTION

1. Field of the Invention

The present invention relates to an apparatus for and a method of making an inflation film.

2. Description of the Related Art

The inflation molding technique has been widely employed in the manufacture of films made of a thermoplastic resin such as a polyolefin including a low density polyethylene, a high density polyethylene and so on, because an apparatus for conducting the inflation molding is simple and inexpensive. According to the general inflation molding, a molten thermoplastic resin is extruded through a circular die of an extruder and the extruded tubular film is drawn with an outer surface thereof cooled by a stream of air blown off from a cooling ring, while, at the same time, a gaseous medium such as air is introduced into an inner space of the tubular film so that the tubular film can be expanded to a predetermined size by the effect of the pressure of the gaseous medium, and the expanded tubular film is then passed through a pair of nipping rolls to flatten the tubular film to give a folded sheet. Thereafter, the folded sheet, that is the flattened tubular film, may be converted into two separate flat films with the lug of the folded sheet cut off by a slitter. The flattened tubular film or the resulting flat films are then wound up around a take-up roll or reel.

With the inflation molding technique discussed above, the tubular film extruded from the extruder through the circular die is stretched in a longitudinal direction thereof and also in a direction transverse to the longitudinal direction by the effect of a take-up and an expansion. Also, at the same time, the film transits from a molten state to a solid state by cooling and, during the course of the cooling, the physical properties thereof are fixed. Thus, in the inflation molding, the cooling process plays an important role in defining the physical properties of the resulting film.

Various attempts have been made to suppress the variation of the quality of the film obtained by the inflation molding. For example, the Japanese Patent Application Laid-open No. Hei 6-182868 (JPA 6-182868) discloses an inflation film making apparatus provided with a control means for controlling the quantity of a stream of air blown from the cooling ring so that the position of the frost line for the tubular film, extruded from a circular die, can be kept at a predetermined height above the circular die. The frost line referred to above is a process line at which the tubular film is solidified, by cooling, to have a designed diameter.

The Japanese Patent Application Laid-open No. Hei 6-39916 (JPA 6-39916) discloses an inflation film making method and an apparatus for use in this method in which, in addition to a first air ring disposed in the vicinity of a circular die, a second air ring having a plurality of annular slits is provided at a position where a bubble of a thermoplastic resin extruded from the circular die undergoes a rapid expansion. According to this apparatus, cooling of the bubble is effected by the air blown from the first air ring and the cooling condition is adjusted so that the temperature of the bubble, when reaching the position of the second air ring, can fall within the predetermined temperature range.

It has, however, been found that, according to the inflation film making apparatus disclosed in JPA 6-182868, although the control for the frost line position can effectively work to a certain extent, the formed film tends to exhibit a variation in film thickness and occurrence of slack and wrinkles, all of which are caused by a fluttering motion of the bubble, that is the tubular film in a molten state.

On the other hand, JPA 6-39916 describes that the second air ring is preferably so constructed as to blow off the cooling air in a direction generally parallel to the direction in which the bubble is drawn or towards the outside of the bubble and that "the atmosphere of reduced pressure created by the blow of the cooling air directly affects the bubble enough to cause a rapid expansion of the bubble at this position". This method is intended to control the position at which the expansion of the bubble starts, in order to suppress the instability of the bubble formed by inflation molding with a long neck type even where a thermoplastic resin of a low melt tension is employed.

However, although JPA 6-39916 discloses that the temperature of the bubble at the position of the second air ring is adjusted to fall within the predetermined temperature range, it does not address the variation of the temperature of the bubble. Also, the air blown from the second air ring is described to create the atmosphere of reduced pressure, but this is likely to cause an abrupt change in the manner of the bubble being cooled. Therefore, the method disclosed in JPA 6-39916 requires a precise adjustment of the operating condition in order to suppress the change in the quality of the formed film.

SUMMARY OF THE INVENTION

In view of the foregoing, the present invention has been made and is intended to provide an apparatus for and a method of making an inflation film, which are sufficiently effective to suppress the variation in the quality of the formed film.

In the manufacture of the film by the inflation molding, in order to suppress the variation in the quality of the formed film, it is preferred to suppress a fluttering motion of the film in a molten state and also to minimize the change in the cooling profile during a cooling process. From this perspective, the present inventors have made intensive studies and have completed the present invention.

More specifically, the present invention provides an apparatus for making an inflation film formed by extruding a raw resin in a molten state through a circular die to form a tubular film and expanding said tubular film by the pressure of a gaseous medium introduced into the inner space thereof, while the tubular film is being cooled. This film making apparatus includes a cooling ring disposed in the vicinity of the circular die, at least one air ring disposed in coaxial relation with the circular die, and an adjusting device for adjusting the temperature of a gaseous medium, blown off from the air ring, to a range effective to retain the tubular film, then still in a molten state, in a condition in which the tubular film is inflated.

The present invention also provides a method of making an inflation film that is performed with the film making apparatus referred to above.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, the same reference numerals are used to specify the same parts throughout the several views, and:

DETAILED DESCRIPTION OF THE PREFERRED EMBODIMENTS

Figure 1:
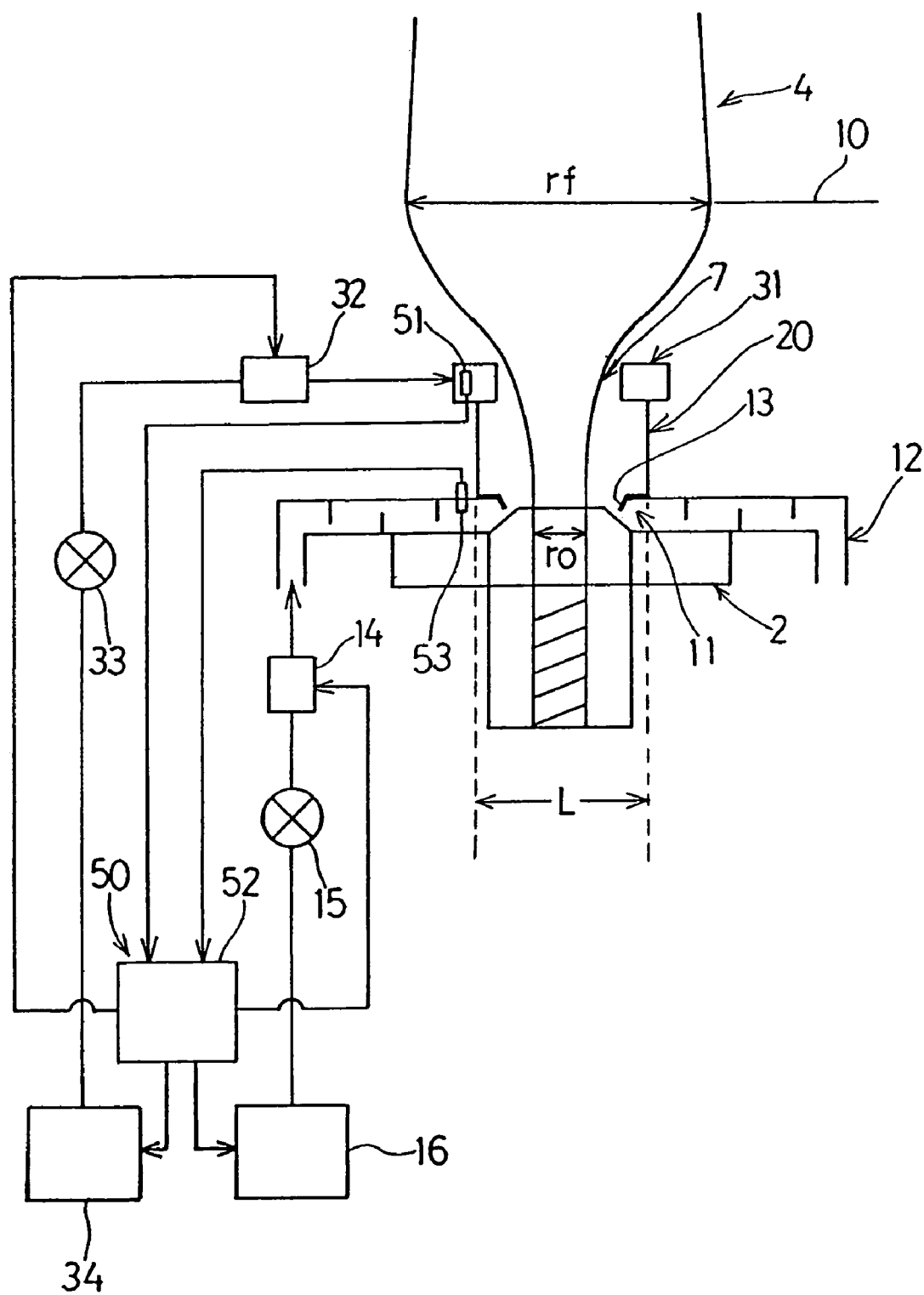
FIG. 1 is a schematic vertical sectional view of an apparatus for making an inflation film according to a preferred embodiment of the present invention.

The raw resin that can be employed in the practice of the present invention includes olefinic resins such as a low density polyethylene (LDPE), a high density polyethylene (HDPE), a linear low density polyethylene (LLDPE), a polypropylene, an α-olefin polymer and a copolymer of ethylene and an unsaturated ester; ethylene-vinyl alcohol copolymers; soft polyvinyl chlorides; soft polyvinylidene chlorides; polyamides; polystyrenes; polyarylates; and thermoplastic liquid crystal polymers such as a thermoplastic liquid crystal polyester.

The present invention is particularly useful in the manufacture of a film made of thermoplastic liquid crystal polymer. The thermoplastic liquid crystal polymer has such a property that, when the thermoplastic liquid crystal polymer is extruded from a slit of a die of an extruder, molecules of such polymer tend to orient in a direction along with the extruded direction, bringing about a difference in characteristics between the longitudinal direction of the film (which may be hereinafter referred to as MD, machine direction) and in a direction perpendicular to MD (which may be hereinafter referred to as TD, transverse direction). In other words, the thermoplastic liquid crystal polymer, when extruded from the die slit, has a tendency to become an anisotropic film. However, when the thermoplastic liquid crystal polymer is formulated into a film by the inflation molding technique, the resulting film is stretched also in TD during expansion with the anisotropy thereof being relieved and, therefore, an isotropic film can easily be obtained.

In terms of processability and the heat resistance of the formed film, the thermoplastic liquid crystal polymer has a melting point, which is a transition temperature to an optically anisotropic melt phase, preferably within the range of 200 to 400° C. and, more preferably, within the range of 250 to 350° C.

The apparatus of the present invention is operable to extrude a raw resin in a molten state through a circular die to form a tubular film, and to expand the tubular film by the pressure of a gaseous medium introduced into an inner space of the tubular film, while the tubular film is being cooled. This apparatus is provided with a cooling ring disposed in the vicinity of the circular die, at least one air ring disposed in coaxial relation with the circular die, and an adjusting device for adjusting the temperature of a gaseous medium, blown off from the air ring, to a range effective to retain the tubular film, then still in a molten state, in a condition in which the tubular film is inflated.

The tubular film in the molten state can be supported as it is by the gaseous medium, blown from the air ring, of a temperature adjusted to the above-described range. As a result, any undesirable fluttering motion of the film in the molten state and any undesirable variation in cooling condition can be suppressed so sufficiently that the variation in the quality of the formed films can be suppressed.

The air ring employed in the apparatus of the present invention is preferably provided with a height adjusting mechanism. With this height adjusting mechanism, the position of the frost line can be adjusted to desired height depending on the kind of the raw resin and/or the desired film thickness and, therefore, the apparatus of the present invention can be easily employed for making various kinds of film.

Referring first to FIG. 1, there is shown an apparatus for making an inflation film according to a preferred embodiment of the present invention as a schematic vertical sectional view. The apparatus shown therein includes a circular die 2 and a cooling ring 12 having a blow out port 11. The cooling ring 12 is positioned immediately above the circular die 2 in coaxial relation of the latter. The apparatus also includes a protective cylinder 20 positioned around the blow out port 11 in the cooling ring 12 in coaxial relation with the circular die 2 for enclosing a neck 7 of a bubble, that is the tubular film in a molten state. The protective cylinder 20 has an upper end on which an air ring 31 is mounted in coaxial relation with the circular die 2. Although not shown, as is the case with the general inflation film making apparatus, arrangement is made to introduce a gaseous medium into an inner space of the tubular film 4 in a molten state as extruded from the circular die 2. In FIG. 1, there is shown an example in which a thermoplastic liquid crystal polyester is used as a raw resin and the tubular film 4 as extruded from the circular die 2 is expanded by the effect of the gaseous medium introduced into the inner space of the tubular film 4 and is cooled to solidify when it reaches a frost line 10.

The ratio (expansion ratio) between the inner diameter r0 of the tubular film 4 immediately after having been extruded from the circular die 2 and the inner diameter rf of the solidified tubular film 4 at the frost line 10 can be suitably chosen depending on the kind of the raw resin and physical properties of the resulting film, and is generally within the range of 2 to 10.

The protective cylinder 20 can prevent the gaseous medium, blown from the cooling ring 12, from spreading or leaking off from around the tubular film 4 so as to result in a minimization of a fluttering motion of the tubular film 4. Therefore, the use of the protective cylinder 20 is preferred. This protective cylinder 20 has an inner diameter L which is generally within the range of a value r0×2, equal to twice the inner diameter r0 of the film 4 as extruded from the circular die 2, to a value rf, equal to the inner diameter rf of the film 4 solidified at the frost line 10.

Also, in order to keep at a constant value the distance between the inner surface of the protective cylinder 20 and the tubular film 4 in the molten state, the protective cylinder 20 may have its inside designed to represent a funnel shape.

The apparatus shown in FIG. 1 also includes an annular guide member 13 mounted around the blow out port 11 of the cooling ring 12. The annular guide member 13 makes the cooling air blown from the cooling ring 12 flow towards the tubular film 4.

The cooling ring 12 is fluid coupled with a first blower 16 through a first temperature adjusting means 14, such as a heater, and then through a first valve 15. Accordingly, a stream of air from the first blower 16 flows through the first valve 15 to the first temperature adjusting means 14 at which the temperature of the air stream is adjusted to a predetermined value. The temperature controlled air from the first temperature adjusting means 14 then flows towards the blow out port 11 of the cooling ring 12 and is applied therefrom to the tubular film 4 to cool the latter.

Similarly, the air ring 31 is fluid coupled with a second blower 34 through a second temperature adjusting means 32 and then through a second valve 33. Accordingly, a stream of a gaseous medium from the second blower 34 is supplied through the second valve 33 to the second temperature adjusting means 32 and is, after the air stream has been warmed by the second temperature adjusting means 32, further supplied to the air ring 31 from which it is blown off to the tubular film 4 in a molten state.

The air ring 31 is provided with an adjusting device 50 for adjusting the temperature of the gaseous medium to be blown off therefrom to a range effective to maintain the tubular film 4 in a condition in which the tubular film is inflated. This air ring 31 has a temperature sensor 51 disposed therein for detecting the temperature of the gaseous medium being blown off therefrom. In the apparatus shown in FIG. 1, the adjusting device 50 is so constructed as to control the second temperature adjusting means 32, such as a heater, and the second blower 34. Reference numeral 52 represents a CPU (central processing unit) and this CPU 52 can be employed as the adjusting device 50. The adjusting device 50 is operable to regulate the temperature of the gaseous medium, controlled by the second temperature adjusting means 32, and the amount of flow of the gaseous medium, supplied from the second blower 34, to respective values. They are calculated beforehand in consideration of various conditions for the film making so that the temperature of the gaseous medium blown off from the air ring 31 can be adjusted to a predetermined value. The adjusting device 50 can be so designed as to adjust the second valve 33.

In the method of making an inflation film according to the present invention, during a stationary state, those predetermined values need not be changed. However, in the event that a change of the temperature of the gaseous medium blown from the air ring 31 is detected by the temperature sensor 51, the adjusting device 50 may be constructed to work to adjust the temperature of the gaseous medium back to the previous value so as to cancel the temperature change. Also, a detecting means for detecting the temperature of the tubular film 4 in a molten phase may be employable. And, in the event of a change of the temperature of the film 4 in a molten phase is detected by such detecting means, the adjusting device 50 may be constructed to work to adjust the temperature of the gaseous medium to an appropriate value effective to cancel the temperature change of the film 4.

Referring still to FIG. 1, the adjusting device 50 may be constructed so as to also control the first temperature adjusting means 14 and the first blower 16, both fluid coupled with the cooling ring 12. Also, an arrangement may be made so that the temperature of the gaseous medium blown from the cooling ring 12 can be controlled based on a result of detection of the temperature performed by a temperature sensor 53 disposed within the cooling ring 12.

The temperature of the gaseous medium blown off from the cooling ring 12 may be suitably chosen in consideration of the kind of the raw resin, the desired shape of the formed film and/or physical properties of such film, and is chosen to be a value preferably lower than the melting point Tm of the raw resin by 220 to 60° C. [i.e., within the range of (Tm−220)° C. to (Tm−60)° C.] and, more preferably, a value lower than the melting point Tm of the raw resin by 180 to 80° C. [i.e., within the range of (Tm−180)° C. to (Tm−80)° C.]. Also, the velocity of the gaseous medium blown off from the cooling ring 12 falls generally within the range of 1 to 10 m/sec, and, more preferably, within the range of 2 to 5 m/sec.

On the other hand, the temperature of the gaseous medium blown off from the air ring 31 must be within the range effective to retain the tubular film 4, in a molten state, in a condition in which the tubular film is inflated. Therefore, the temperature of the gaseous medium blown off from the air ring 31 may be suitably chosen in consideration of the kind of the raw resin, the desired shape of the formed film, physical properties of such film, the position of the air ring 31 relative to the frost line 10 and/or the direction of flow of the gaseous medium from the air ring 31. In general, the temperature of the gaseous medium blown off from the air ring 31 falls preferably within the range of a value lower than the melting point Tm of the raw resin by 80° C. [i.e., (Tm−80)° C.] to a value higher than the melting point Tm of the raw resin by 20° C. [i.e., (Tm+20)° C.] and, more preferably, within the range of a value lower than the melting point Tm of the raw resin by 60° C. [i.e., (Tm−60)° C.] to a value higher than the melting point Tm of the raw resin by 5° C. [i.e., (Tm+5)° C.]. Also, the velocity of the gaseous medium blown off from the air ring 31 falls preferably within the range of 1 to 10 m/sec., and, more preferably, within the range of 3 to 10 m/sec.

The direction in which the gaseous medium is blown off from the air ring 31 is not specifically limited to a particular direction, provided that it is oriented in such a direction as to enable to the tubular film 4 in a molten state to be supported in position.

The air ring 31 is disposed in coaxial relation with the cooling ring 12. Although the air ring 31 can be positioned at any location above the cooling ring 12 and below the frost line 10, it is preferably positioned at a height spaced 5 to 15 cm below the frost line 10.

Also, the air ring 31 may have any suitable structure and is not limited to a specific structure. It may be of a structure having a single slit as a blow out port from which the gaseous medium can be blown off. However, the air ring 31 may have a structure including a plurality of slits as the blow out port.

Preferably, the air ring 31 is provided with or operatively associated with a height adjusting mechanism 21 operative to adjust and maintain the air ring 31 at any height (i.e., position) dependent on the frost line 10, the position of which is varied depending on the kind of raw resin employed.

Figure 2:
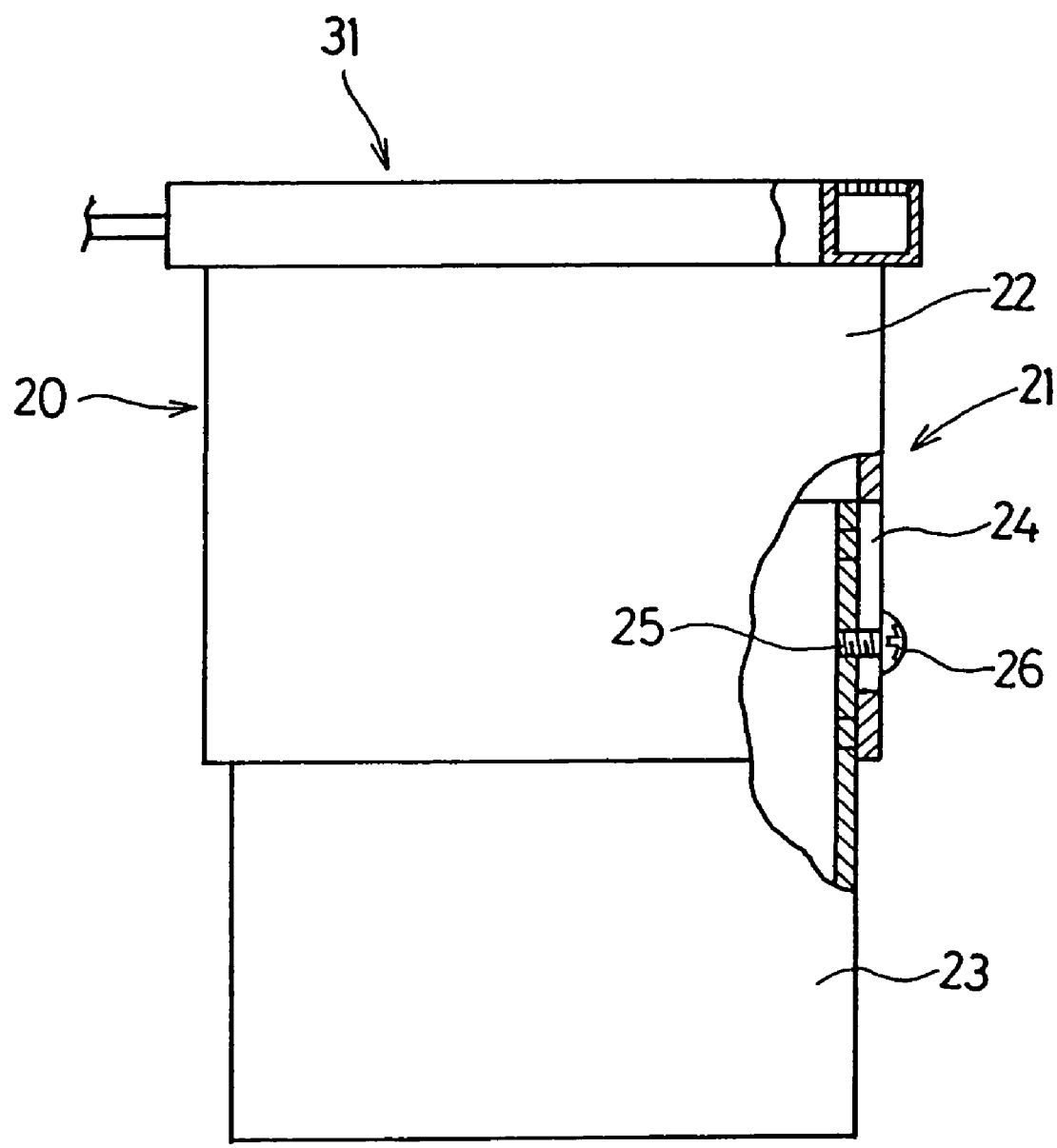
FIG. 2 is a front view, with a portion cut out, showing a height adjusting mechanism employed in the apparatus for making an inflation film.

FIG. 2 illustrates, in a front view with a portion cut out, the height adjusting mechanism 21 employed in the apparatus. In the embodiment shown therein, the protective cylinder 20 is utilized as a base for the height adjusting mechanism 21. Specifically, the protective cylinder 20 is made up of a first cylindrical body 22, on which the air ring 31 is mounted, and a second cylindrical body 23 coaxially slidably, that is, telescopically inserted in the first cylindrical body 22. The first cylindrical body 22 has at least one slot 24 defined therein so as to extend a certain length in a direction parallel to the longitudinal axis of the protective cylinder 20 for receiving an adjustment screw 26, which extends through such slot 24 and is threadingly engaged in a screw hole 25 defined in the second cylindrical body 23.

Thus, it will readily be understood that the height adjustment mechanism 21 is operable to determine the position of the first cylindrical body 22 relative to the second cylindrical body 23 and also to the frost line 10 so that the protective cylinder 20 as a whole can have an adjusted axial length, and also to fix them in position relative to each other when the adjustment screw 26 is fastened.

It is to be noted that, although not shown in FIG. 1, the solidified tubular film 4 may be converted into a folded sheet as it is passed through a pair of nipping rolls. The folded sheet may be further converted into two separate films with the lug of the folded sheet cut off by a slitter. The folded sheet or the separate films may be wound up around a take-up roll or reel.

The gaseous medium blown off from each of the cooling ring 12, the air ring 31 and an air ring 41, which may be optionally employed as will be described later in connection with another preferred embodiment of the present invention, and a gaseous medium to be introduced into the inner space of the tubular film 4 may be any gaseous medium that does not bring about an adverse effect on the raw resin. Examples of those gaseous mediums include air, nitrogen and carbon dioxide. Among them, air is preferred in terms of the manufacturing cost.

Figure 3:
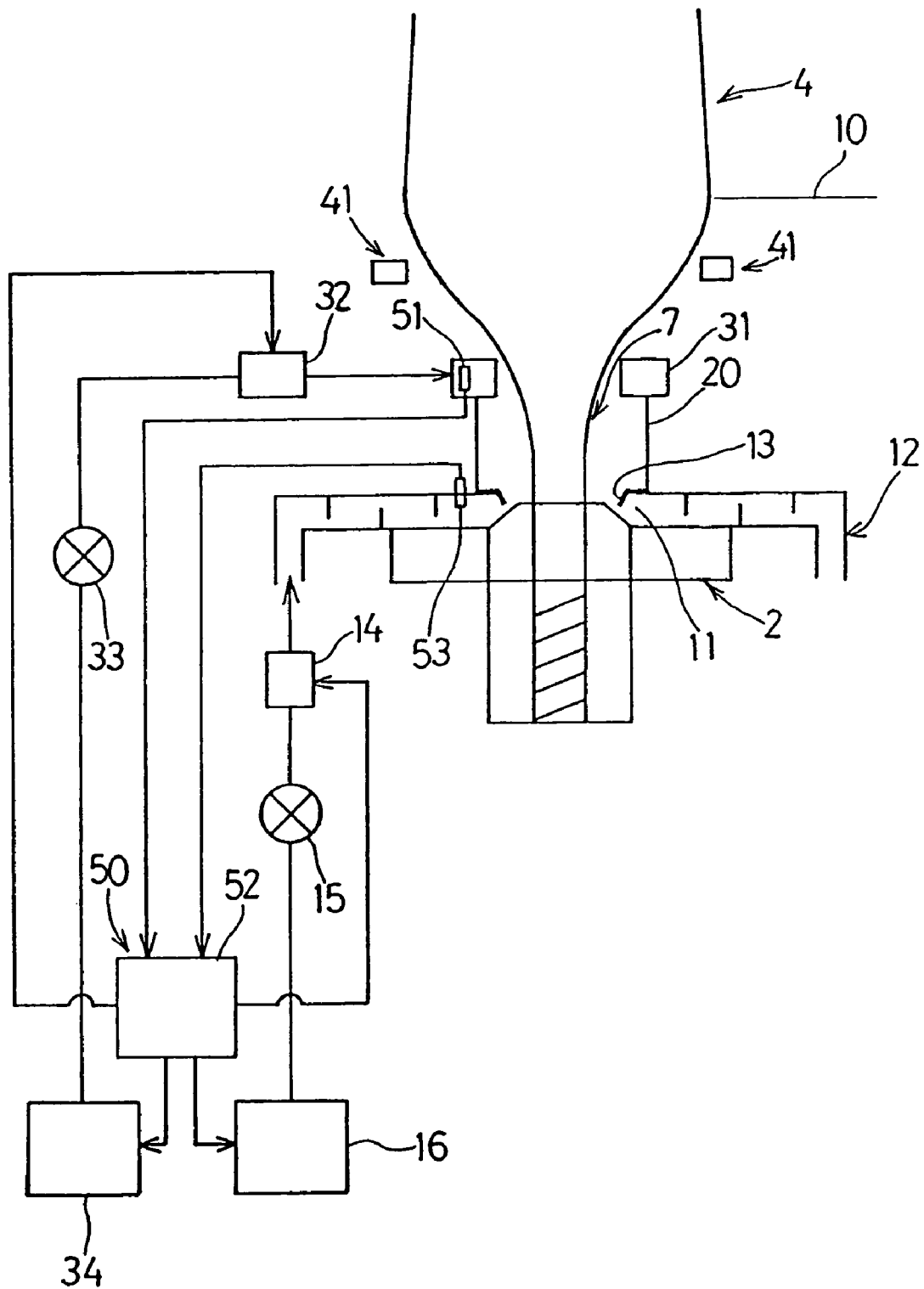
FIG. 3 is a schematic vertical sectional view of the apparatus for making an inflation film according to another preferred embodiment of the present invention.

FIG. 3 illustrates the apparatus according to another preferred embodiment of the present invention. In this apparatus shown therein, in addition to the air ring 31, the second air ring 41 is employed and disposed below the frost line 10. Although not shown, this second air ring 41 is also provided with a third valve, a third temperature adjusting means, such as a heater, and a third blower and is also fluid coupled with the adjusting device 50 for adjusting the temperature of the gaseous medium blown off from the second air ring 41. Adjustment of the temperature of the gaseous medium blown off from the second air ring 41 may be carried out in a manner similar to that of the gaseous medium blown off from the first air ring 31 discussed above. Also, the velocity and flow direction of the gaseous medium blown off from the second air ring 41 may be similar to those previously discussed in connection with the gaseous medium blown off from the first air ring 31.

Other structural features of the apparatus shown in FIG. 3 are similar to those of the apparatus shown in and described with reference to FIG. 1 and, therefore, the details thereof are not mentioned for the sake of brevity. Components of the apparatus of FIG. 3 that are similar to those of the apparatus of FIG. 1 are designated by the same reference numerals.

Hereinafter, the method of making a thermoplastic liquid crystal polymer film in accordance with the present invention will be demonstrated by way of specific examples which are not intended to limit the scope of the present invention. It is to be noted that evaluation of properties of the thermoplastic liquid crystal polymer film such as variation in film thickness and appearance and evaluation of the stability of the tubular film (bubble) were carried out by the following manners:

(1) Variation in Film Thickness:

The formed film is cut in a direction of the mechanical axis thereof (MD) to provide a sample of 4 meters in length. The film thickness of the sample is measured at twenty points at intervals of 20 cm in MD and also at twenty four points in a direction (TD) perpendicular to MD, that is, at 480 (=20×24) points in total, and the difference between the greatest film thickness and the smallest film thickness is taken as a quantity of variation in film thickness.

Figure 4:
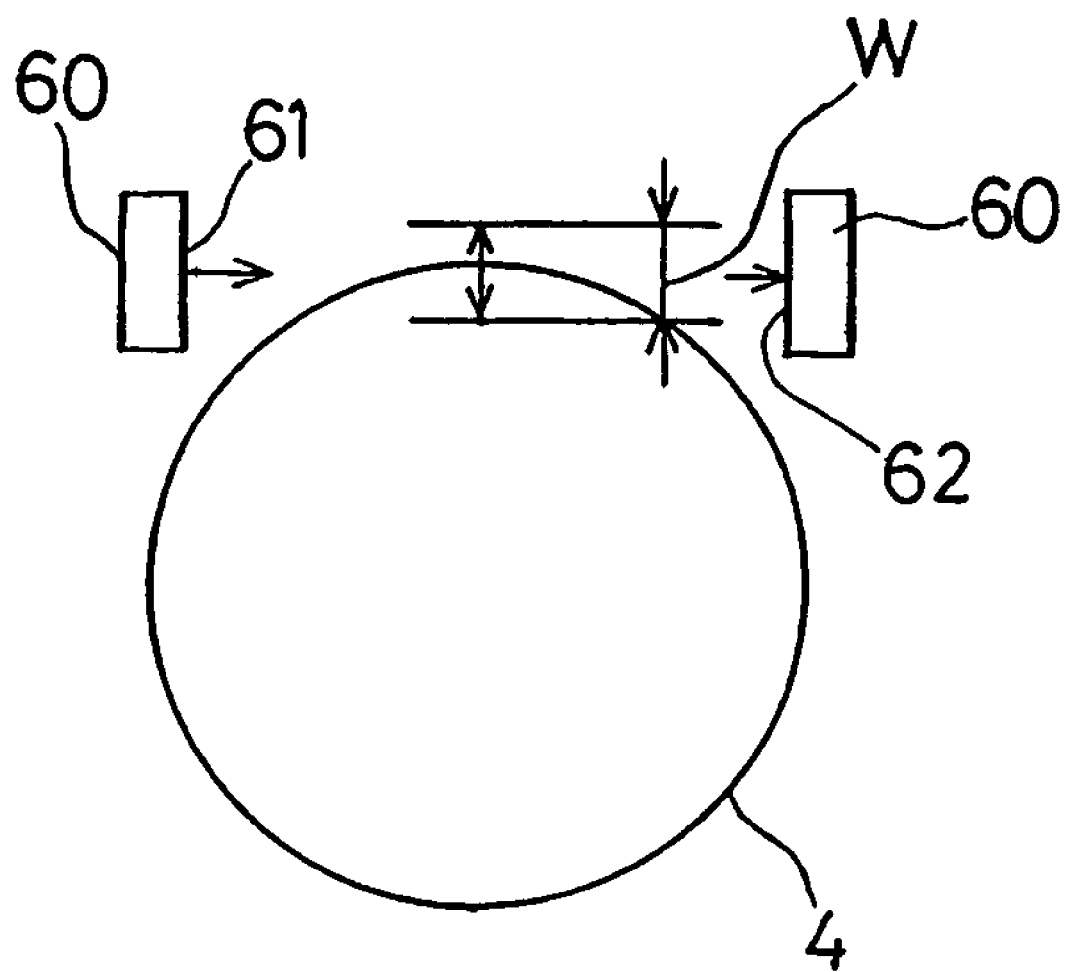
FIG. 4 is a schematic plan view showing the manner of evaluating the stability of a bubble.

(2) Bubble Stability:

As shown in FIG. 4, two laser displacement sensors 60 and 60, one including a laser beam emitting port 61 and the other including a laser beam receiving port 62 aligned with the laser beam emitting port 61, are positioned in face-to-face relation with each other so as to intercept the tubular film 4 at a location above the frost line, and the strength of the laser beam intercepted by the film is measured. The extent to which the film flutters, that is, the magnitude W (mm) of fluttering of the film is detected in terms of change in strength of the laser beam so intercepted. The standard deviation ($\sigma$) of the magnitude W of fluttering of the film is used as an index of the bubble stability. The smaller the standard deviation is, the higher the stability of the bubble is.

(3) Appearance:

1000 meter sample of the formed film is observed visually and evaluated as follows.

| | |
|---|---|
| Excellent: | No wrinkle was observed |
| Good: | 1 to 10 wrinkles were observed. |
| Moderate: | 11 to 50 wrinkles were observed. |
| No Good: | 51 or more wrinkles were observed. |

EXAMPLE 1

Using the apparatus shown in and described with reference to FIG. 1, inflation molding of a thermoplastic liquid crystal polyester having a melting point of 283° C. ("VECTRA A950", manufactured by Polyplastics Co., Ltd.), was carried out under the following conditions to give a tubular film which was wound up around a take-up roll. The formed thermoplastic liquid crystal polyester film had an average film thickness of 25 µm and an average folding width of 314 mm.

As shown in Table 1, the quantity of variation in film thickness of the formed film was 5 µm and the standard deviation ($\sigma$) as an index of the stability during the manufacture of the film was 1.0 mm. Also, no wrinkles was found in the formed film, evaluation of which was "Excellent".

Inflation Molding Conditions:

| | |
|---|---|
| Diameter of Circular die 2: | 50 mm |
| Slit Width in Circular die 2: | 250 µm |
| Diameter of the Protective Cylinder 20: | 150 mm |
| Temperature of Raw Resin as Extruded: | 283° C. |
| Amount of Molten Raw Resin Extruded: | 13 kg/hr |
| Film Take-Up Speed: | 9.9 m/min. |
| Expansion Ratio: | 4 |
| Position of Cooling Ring 12: | Immediately above Circular Die 2 |
| Temperature of Air from Cooling Ring 12: | 150° C. |
| Velocity of Air from Cooling Ring 12: | 5 m/sec. |
| Position of Air Ring 31: | 200 mm apart from Circular Die 2 |
| Temperature of Air from Air Ring 31: | 230° C. |
| Velocity of Air from Air Ring 31: | 5 m/sec. |
| Direction of Air Flow from Air Ring 31: | Vertically Upwards |
| Position of Frost Line: | 300 mm apart from Circular die 2 |

EXAMPLES 2 AND 3

The inflation molding of the liquid crystal polyester was carried out in a manner similar to that of Example 1, except that the temperature and the velocity of the gaseous medium blown off from the cooling ring 12 and those from the air ring 31 were adjusted to respective values, as shown in Table 1, to give a thermoplastic liquid crystal polyester film having an average film thickness of 25 µm and an average fold width of 314 mm. The quantity of variation in film thickness of the formed films under Examples 2 and 3, their appearance and the standard deviation ($\sigma$) as an index of the stability during the manufacture of each of the films were shown in Table 1.

TABLE 1

| Example Nos. | Cooling Ring 12 | | Air Ring 31 | | Result of Film Formation | | |
|---|---|---|---|---|---|---|---|
| | Velocity of Air (m/sec) | Temp. of Air (° C.) | Velocity of Air (m/sec) | Temp. of Air (° C.). | Bubble Stability [σ (mm)] | Thickness Variation (μm) | Appearance |
| 1 | 5 | 150 | 5 | 230 | 1.0 | 5 | Excellent |
| 2 | 2 | 150 | 8 | 230 | 1.5 | 7 | Good |
| 3 | 5 | 125 | 5 | 250 | 1.3 | 6 | Good |

COMPARATIVE EXAMPLE 1

Using an apparatus having a structure similar to that of the apparatus shown in and described with reference to FIG. 1, wherein neither the protective cylinder 20 nor the air ring 31 was employed, inflation molding of a thermoplastic liquid crystal polyester ("VECTRA A950") was carried out under the following conditions to give a tubular film which was wound up around a take-up roll. The formed thermoplastic liquid crystal polyester film had an average film thickness of 25 μm and an average fold width of 314 mm.

The formed film showed the quantity of variation in film thickness of 13 μm, and the standard deviation (σ) as an index of the stability during the manufacture of the film was 2.5 mm. Also, numerous wrinkles were found in the formed film, evaluation of which was "No Good".

Inflation Molding Conditions:

| | |
|---|---|
| Diameter of Circular Die 2: | 50 mm |
| Slit Width in Circular Die 2: | 250 μm |
| Temperature of Raw Resin as Extruded: | 283° C. |
| Amount of Molten Raw Resin Extruded: | 13 kg/hr |
| Film Take-Up Speed: | 9.9 m/min. |
| Expansion Ratio: | 4 |
| Position of Cooling Ring 12: | Immediately above Circular Die 2 |
| Temperature of Air from Cooling Ring 12: | 150° C. |
| Velocity of Air from Cooling Ring 12: | 2 m/sec. |

COMPARATIVE EXAMPLE 2

Using an apparatus having a structure similar to that of the apparatus shown in and described with reference to FIG. 1, wherein no air ring 31 was employed, inflation molding of a thermoplastic liquid crystal polyester ("VECTRA A950") was carried out under the following condition to give a tubular film which was wound up around a take-up roll. The formed thermoplastic liquid crystal polyester film had an average film thickness of 25 μm and an average fold width of 314 mm.

The formed film showed the quantity of variation in film thickness of 11 μm, and the standard deviation (σ) as an index of the stability during the manufacture of the film was 2.0 mm. Also, the presence of wrinkles was found in the formed film, evaluation of which was "Moderate".

Inflation Molding Conditions:

| | |
|---|---|
| Diameter of Circular Die 2: | 50 mm |
| Slit Width in Circular Die 2: | 250 μm |
| Diameter of the Protective Cylinder 20: | 150 mm |
| Temperature of Raw Resin as Extruded: | 283° C. |
| Amount of Molten Raw Resin Extruded: | 13 kg/hr |
| Film Take-Up Speed: | 9.9 m/min. |
| Expansion Ratio: | 4 |
| Position of Cooling Ring 12: | Immediately above Circular Die 2 |
| Temperature of Air from Cooling Ring 12: | 150° C. |
| Velocity of Air from Cooling Ring 12: | 5 m/sec. |

EXAMPLE 4

Using the apparatus of the structure shown in and described with reference to FIG. 1, inflation molding of a thermoplastic liquid crystal polyester having a melting point of 325° C. ("VECTRA C950", manufactured by Polyplastics Co., Ltd.) was carried out under the following conditions to give a tubular film which was wound up around a take-up roll. The formed thermoplastic liquid crystal polyester film had an average film thickness of 50 μm and an average fold width of 314 mm.

As shown in Table 2, the quantity of variation in film thickness of the formed film was 6 μm and the standard deviation (σ) as an index of the stability during the manufacture of the film was 1.2 mm. Also, almost no wrinkle was found in the formed film, evaluation of which was "Good".

Inflation Molding Conditions:

| | |
|---|---|
| Diameter of Circular Die 2: | 40 mm |
| Slit Width in Circular Die 2: | 500 μm |
| Diameter of the Protective Cylinder 20: | 150 mm |
| Temperature of Raw Resin as Extruded: | 325° C. |
| Amount of Molten Raw Resin Extruded: | 26 kg/hr |
| Film Take-Up Speed: | 10 m/min. |
| Expansion Ratio: | 5 |
| Position of Cooling Ring 12: | Immediately above Circular Die 2 |
| Temperature of Air from Cooling Ring 12: | 195° C. |
| Velocity of Air from Cooling Ring 12: | 5 m/sec. |
| Position of Air Ring 31: | 250 mm apart from Circular Die 2 |
| Temperature of Air from Air Ring 31: | 275° C. |
| Velocity of Air from Air Ring 31: | 10 m/sec. |
| Direction of Air Flow from Air Ring 31: | Vertically Upwards |
| Position of Frost Line: | 350 mm apart from Circular Die 2 |

EXAMPLE 5

Using the apparatus of the structure shown in and described with reference to FIG. 1, inflation molding of a thermoplastic liquid crystal polyester having a melting point of 340° C. ("VECTRA Ei950", manufactured by Polyplastics Co., Ltd.) was carried out under the following conditions to give a tubular film which was wound around a take-up roll. The formed thermoplastic liquid crystal polyester film had an average film thickness of 100 μm and an average fold width of 314 mm.

As shown in Table 2, the quantity of variation in film thickness of the formed film was 5 μm and the standard deviation (σ) as an index of the stability during the manufacture of the film was 1 mm. Also, no wrinkle was found in the formed film, evaluation of which was "Excellent".

Inflation Molding Conditions:

| | |
|---|---|
| Diameter of Circular Die 2: | 67 mm |
| Slit Width in Circular Die 2: | 1000 μm |

-continued

| | |
|---|---|
| Diameter of the Protective Cylinder 20: | 150 mm |
| Temperature of Raw Resin as Extruded: | 340° C. |
| Amount of Molten Raw Resin Extruded: | 39 kg/hr |
| Film Take-Up Speed: | 7.5 m/min. |
| Expansion Ratio: | 3 |
| Position of Cooling Ring 12: | Immediately above Circular die 2 |
| Temperature of Air from Cooling Ring 12: | 210° C. |
| Velocity of Air from Cooling Ring 12: | 5 m/sec. |
| Position of Air Ring 31: | 300 mm apart from Circular Die 2 |
| Temperature of Air from Air Ring 31: | 290° C. |
| Velocity of Air from Air Ring 31: | 8 m/sec. |
| Direction of Air Flow from Air Ring 31: | Vertically Upwards |
| Position of Frost Line: | 400 mm apart from Circular Die 2 |

EXAMPLE 6

Using the apparatus of the structure shown in and described with reference to FIG. 1, inflation molding of a high density polyethylene having a melting point of 135° C. ("HI-ZEX 7000F", manufactured by Mitsui Chemicals, Inc.) was carried out under the following conditions to give a tubular film which was wound up around a take-up roll. The formed polyethylene film had an average film thickness of 25 μm and an average fold width of 314 mm.

As shown in Table 2, the quantity of variation in film thickness of the formed film was 7 μm and the standard deviation (σ) as an index of the stability during the manufacture of the film was 1.2 mm. Also, no wrinkle was found in the formed film, evaluation of which was "Excellent".

Inflation Molding Conditions:

| | |
|---|---|
| Diameter of Circular Die 2: | 50 mm |
| Slit Width in Circular Die 2: | 250 μm |
| Diameter of the Protective Cylinder 20: | 150 mm |
| Temperature of Raw Resin as Extruded: | 165° C. |
| Amount of Molten Raw Resin Extruded: | 12 kg/hr |
| Film Take-Up Speed: | 13.5 m/min. |
| Expansion Ratio: | 4 |

-continued

| | |
|---|---|
| Position of Cooling Ring 12: | Immediately above Circular Die 2 |
| Temperature of Air from Cooling Ring 12: | 55° C. |
| Velocity of Air from Cooling Ring 12: | 4 m/sec. |
| Position of Air Ring 31: | 350 mm apart from Circular Die 2 |
| Temperature of Air from Air Ring 31: | 130° C. |
| Velocity of Air from Air Ring 31: | 8 m/sec. |
| Direction of Air Flow from Air Ring 31: | Vertically Upwards |
| Position of Frost Line: | 450 mm apart from Circular Die 2 |

TABLE 2

| | Cooling Ring 12 | | Air Ring 31 | | Result of Film Formation | | |
|---|---|---|---|---|---|---|---|
| Example Nos. | Velocity of Air (m/sec) | Temp. of Air (° C.) | Velocity of Air (m/sec) | Temp. of Air (° C.). | Bubble Stability [σ (mm)] | Thickness Variation (μm) | Appearance |
| 4 | 5 | 195 | 10 | 275 | 1.2 | 6 | Good |
| 5 | 5 | 210 | 8 | 290 | 1.0 | 5 | Excellent |
| 6 | 4 | 55 | 8 | 130 | 1.2 | 7 | Excellent |

COMPARATIVE EXAMPLE 3

Using an apparatus having a structure similar to that of the apparatus shown in and described with reference to FIG. 1, wherein no air ring 31 was employed, inflation molding of a high density polyethylene ("HI-ZEX 7000F") was carried out under the following conditions to give a tubular film which was wound up around a take-up roll. The formed polyethylene film had an average film thickness of 25 μm and an average fold width of 314 mm.

The formed film showed the quantity of variation in film thickness of 14 μm, and the standard deviation (σ) as an index of the stability during the manufacture of the film was 3.0 mm. Also, numerous wrinkles were found in the formed film, evaluation of which was "No Good".

Inflation Molding Conditions:

| | |
|---|---|
| Diameter of Circular Die 2: | 50 mm |
| Slit Width in Circular Die 2: | 250 μm |
| Diameter of the Protective Cylinder 20: | 150 mm |
| Temperature of Raw Resin as Extruded: | 165° C. |
| Amount of Molten Raw Resin Extruded: | 12 kg/hr |
| Film Take-Up Speed: | 13.5 m/min. |
| Expansion Ratio: | 4 |
| Position of Cooling Ring 12: | Immediately above Circular Die 2 |
| Temperature of Air from Cooling Ring 12: | 55° C. |
| Velocity of Air from Cooling Ring 12: | 4 m/sec. |

From the foregoing, it has now clear that the method of the present invention exemplified under any of Examples 1 to 6 is effective to improve the stability during the inflation molding and to provide uniform films with a less variation of the quality such as variation in film thickness, in contrast to the method exemplified under the Comparative Examples 1 to 3.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An apparatus for making an inflation film formed by extruding a thermoplastic liquid crystal polymer in a molten state through a circular die to form a tubular film, and expanding said tubular film by the pressure of a gaseous medium introduced into an inner space of the tubular film, while the tubular film is being cooled, said apparatus comprising:
    a cooling ring disposed in the vicinity of the circular die;
    at least one air ring disposed above the cooling ring in coaxial relation with the circular die;
    a heater to heat a gaseous medium supplied to and then be blown off from the air ring at a temperature effective to retain said tubular film, then still in a molten state, in a condition in which said tubular film is inflated; and
    a control device to control said heater in order to adjust the temperature of a gaseous medium supplied to the air ring.

2. The apparatus as claimed in claim 1, wherein the air ring is provided with a height adjusting mechanism.

3. The apparatus as claimed in claim 1, wherein said apparatus further comprises a heater to heat a gaseous medium supplied to and then blown off from the cooling ring.

4. The apparatus as claimed in claim 3, wherein the control device is configured to adjust a temperature of the gaseous medium blown off from the cooling ring.

5. The apparatus as claimed in claim 4, wherein the apparatus further comprises a sensor to detect the temperature of the gaseous medium blown off from the air ring and/or the cooling ring.

6. A method of making an inflation film, which comprises:
    extruding a thermoplastic liquid crystal polymer in a molten state through a circular die to form a tubular film;
    expanding said tubular film by the pressure of a gaseous medium introduced into an inner space of the tubular film, while the tubular film is being cooled; and
    blowing a gaseous medium heated by a heater at a temperature effective to retain the tubular film, then still in a molten phase, in a condition in which the tubular film is inflated, from at least one air ring, disposed in coaxial relation with the circular die together with a cooling ring disposed in the vicinity of the circular die, said air ring being positioned above the cooling ring.

7. The method as claimed in claim 6, wherein a gaseous medium heated by a heater is also blown off from the cooling ring.

8. The method as claimed in claim 7, wherein the temperature of a gaseous medium blown off from the air ring and/or from the cooling ring is adjustable.

9. The method as claimed in claim 7, which comprises a sensor wherein the temperature of a gaseous medium blown off from the air ring and/or the cooling ring is detected by said sensor so as to be adjusted.

* * * * *